United States Patent
Maes

(10) Patent No.: US 6,477,500 B2
(45) Date of Patent: *Nov. 5, 2002

(54) TEXT INDEPENDENT SPEAKER RECOGNITION WITH SIMULTANEOUS SPEECH RECOGNITION FOR TRANSPARENT COMMAND AMBIGUITY RESOLUTION AND CONTINUOUS ACCESS CONTROL

(75) Inventor: Stephane Herman Maes, Danbury, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/548,016

(22) Filed: Apr. 12, 2000

(65) Prior Publication Data

US 2002/0002465 A1 Jan. 3, 2002

Related U.S. Application Data

(63) Continuation of application No. 08/788,471, filed on Jan. 28, 1997, now Pat. No. 6,073,101.
(60) Provisional application No. 60/011,058, filed on Feb. 2, 1996.

(51) Int. Cl.$^7$ .......................... G10L 15/22; G10L 17/00
(52) U.S. Cl. ...................... 704/275; 704/246; 704/251; 704/273
(58) Field of Search ................................ 704/246, 251, 704/275, 273

(56) References Cited

U.S. PATENT DOCUMENTS 4,449,189 A    5/1984   Feix et al.

(List continued on next page.)

FOREIGN PATENT DOCUMENTS

| EP | 0 307 137 A2 | 3/1989 |
| EP | 0 567 135 A1 | 10/1993 |
| JP | 61-30855 | 2/1986 |

OTHER PUBLICATIONS

D. A. Reynolds and L. P. Heck, "Integration of Speaker and Speech Recognition Systems," Proc. IEEE ICASSP 91, vol. 2, p. 869–872, Apr. 1991.*

Primary Examiner—Tālivaldis Ivars Šmits
(74) Attorney, Agent, or Firm—Paul J. Otterstedt

(57) ABSTRACT

Feature vectors representing each of a plurality of overlapping frames of an arbitrary, text independent speech signal are computed and compared to vector parameters and variances stored as codewords in one or more codebooks corresponding to each of one or more enrolled users to provide speaker dependent information for speech recognition and/or ambiguity resolution. Other information such as aliases and preferences of each enrolled user may also be enrolled and stored, for example, in a database. Correspondence of the feature vectors may be ranked by closeness of correspondence to a codeword entry and the number of frames corresponding to each codebook are accumulated or counted to identify a potential enrolled speaker. The differences between the parameters of the feature vectors and codewords in the codebooks can be used to identify a new speaker and an enrollment procedure can be initiated. Continuous authorization and access control can be carried out based on any utterance either by verification of the authorization of a speaker of a recognized command or comparison with authorized commands for the recognized speaker. Text independence also permits coherence checks to be carried out for commands to validate the recognition process.

32 Claims, 2 Drawing Sheets

U.S. PATENT DOCUMENTS

| | | |
|---|---|---|
| 4,450,545 A | 5/1984 | Kishi et al. |
| 4,506,377 A | 3/1985 | Kishi et al. |
| 4,506,378 A | 3/1985 | Noso et al. |
| 4,528,687 A | 7/1985 | Noso et al. |
| 4,558,459 A | 12/1985 | Noso et al. |
| 4,725,956 A | 2/1988 | Jenkins |
| 4,797,924 A | 1/1989 | Schnars et al. |
| 4,827,520 A | 5/1989 | Zeinstra |
| 4,862,363 A | 8/1989 | Krisher et al. |
| 5,086,385 A | 2/1992 | Launey et al. |
| 5,091,947 A | 2/1992 | Ariyoshi et al. |
| 5,142,565 A | 8/1992 | Ruddle |
| 5,165,095 A | 11/1992 | Borcherding |
| 5,214,707 A | 5/1993 | Fujimoto et al. |
| 5,297,183 A | 3/1994 | Bareis et al. |
| 5,369,685 A | 11/1994 | Kero |
| 5,412,738 A | 5/1995 | Brunelli et al. |
| 5,426,415 A | 6/1995 | Parchar et al. |
| 5,426,745 A | 6/1995 | Baji et al. |
| 5,450,525 A | 9/1995 | Russell et al. |
| 5,487,087 A | 1/1996 | McCree et al. |
| 5,526,465 A | 6/1996 | Carey et al. |
| 5,577,164 A * | 11/1996 | Kaneko et al. .............. 704/275 |
| 5,604,790 A * | 2/1997 | Grimes .................... 379/88.04 |
| 5,655,058 A * | 8/1997 | Balasubramanian et al. .............. 704/255 |
| 5,737,485 A * | 4/1998 | Flanagan et al. ............ 704/232 |
| 5,822,727 A * | 10/1998 | Garberg et al. .............. 704/243 |
| 6,018,782 A * | 6/2000 | Rabin ......................... 704/275 |

\* cited by examiner

TEXT INDEPENDENT SPEAKER RECOGNITION WITH SIMULTANEOUS SPEECH RECOGNITION FOR TRANSPARENT COMMAND AMBIGUITY RESOLUTION AND CONTINUOUS ACCESS CONTROL

This application is a continuation of U.S. patent application Ser. No. 08/788,471, filed Jan. 28, 1997, which claims the benefit of provisional application No. 60/011,058 filed Feb. 2, 1996, now U.S. Pat. No. 6,073,101, the contents of which is incorporated by reference. This application is also related to application Ser. No. 09/696,585, filed Oct. 25, 2000, which is a continuation of U.S. Pat. No. 6,161,090, which is a continuation of U.S. Pat. No. 5,897,616.

BACKGROUND OF THE INVENTION

1. Field of the Invention

The present invention generally relates to speech and speaker recognition and, more particularly, to text independent speaker recognition, which may thus include consistency checks of the recognition process, particularly suitable for continuous security and access control and which is transparent to one or more users and provides enhanced resolution of ambiguities between recognizable commands.

2. Description of the Prior Art

Many electronic devices require input from a user in order to convey to the device particular information required to determine or perform a desired function or, in a trivially simple case, when a desired function is to be performed as would be indicated by, for example, activation of an on/off switch. When multiple different inputs are possible, a keyboard comprising an array of two or more switches has been the input device of choice in recent years.

However, keyboards of any type have inherent disadvantages. Most evidently, keyboards include a plurality of distributed actuable areas, each generally including moving parts subject to wear and damage and which must be sized to be actuated by a portion of the body unless a stylus or other separate mechanical expedient is employed. Accordingly, in many types of devices, such as input panels for security systems and electronic calculators, the size of the device is often determined by the dimensions of the keypad rather than the electronic contents of the housing. Additionally, numerous keystrokes may be required (e.g. to specify an operation, enter a security code, personal identification number (PIN), etc.) which slows operation and increases the possibility that erroneous actuation may occur.

Perhaps more importantly, use of a keyboard inherently requires knowledge of particular keystrokes or combinations thereof which are associated with information (e.g. instructions or data) which must be input. For example, a combination of numbers for actuation of a lock for secured areas of a building or a vehicle requires the authorized user to remember the number sequence as well as correctly actuating corresponding switches in sequence to control initiation of a desired function. Therefore, use of a keyboard or other manually manipulated input structure requires action which is not optimally natural or expeditious for the user. Further, for security systems in particular, the security resides in the limitation of knowledge of a keystroke sequence and not in the security system itself since a security system relying upon correct keypad entry cannot identify the individual person who is currently actuating the keys.

In an effort to provide a more naturally usable, convenient and rapid interface and to increase the capabilities thereof, numerous approaches to voice or sound detection and recognition systems have been proposed and implemented with some degree of success. However, some aspects of known voice actuated systems do not significantly improve over keyboards in regard to transparency to a user or continued security once access is initially granted.

For example, a simple voice actuated system which relies on template matching of the acoustical content of an utterance to allow access to a system (e.g. a file or command set existing on a data processing system) generally requires a particular word or phrase to be input for each enrolled (e.g. authorized) user. (Thus, such a system relying on a particular utterance is referred to as being text dependent or text prompted when the text of an utterance is prompted by the recognizer.) Assuming a correct match is found among enrolled users, no further check of the authorization of the user can be made without requiring the particular recognizable utterance to be repeated during an interruption of usage of the system. Thus, without such interruptions of use, such as by periodically prompting the user for a particular utterance, and the consequent inconvenience, once access is granted, subsequent unauthorized use may not be prevented as might occur, for example, if an authorized user were to momentarily leave a terminal without logging off. It should also be recognized that the requirement for the utterance to be confined to particular text is conceptually identical to the use of a predetermined key sequence such as a personal identification number (PIN) entered on a keypad and, moreover, the utterance cannot be protected from interception by others as readily as a key actuation sequence can be adequately shielded from view. Further, simultaneous authorizations may not be accommodated, much less speech recognition ambiguities resolved in text-dependent systems even though the incidence of such ambiguities would be expected to increase as the population of simultaneously authorized speakers increases. Further, text dependent and text prompted systems can be defeated by mechanical or electrical reproduction of speech. In contrast, continuous checks of speech, making attempts to compromise security difficult together with increasing the difficulty of carrying out any unauthorized use to the point of near impossibility would require text independence.

Indeed, when the speaker recognition is performed in parallel with another process, the command or answers produced by the user must be consistent with the procedure. For example, if the speaker recognition is performed while the user interacts with an operator of a call center, as will be later described, the ability to maintain a coherent discussion is a natural way to check that the voice is not the product of reproduction or synthesis. With automatic systems, answers to questions and relevance of the command fulfill the same role. In a more elaborate case, the system could ask questions personal to the user at some random moment in order to check the answer and thus authenticate the process. On the other hand, when the speaker recognition is text independent, all of the interaction is monitored to verify the user while authenticating the answers.

In summary, dependency of speech recognition on specific text is a limitation on the level of security that can be provided as well as the functionality of the entity to which speaker recognition is applied, whether for security purposes or not. More importantly, however, the obtrusiveness attendant upon text dependency effectively prevents speaker recognition from being used in many applications in which it would yield substantial convenience. For example, once a speaker (or even a combination of speakers) is identified, the identification can be used to retrieve a name and personal information such as preferences, history of previous activity such as commands can be retrieved and used to automatically control a device or system, possibly in an adaptive manner.

Such controls could range from automatic seat and steering wheel adjustments in an automobile to establishing communication links and calling applications commonly used by a particular authorized user when the user logs onto the system. Similarly, text independent speaker recognition would be useful in shared voice dialing systems (corporate voice dialing) and voice controlled answering machines in which the identification of an enrolled speaker could be used to retrieve lists of enrolled names to be dialed or from whom messages should be retrieved (particularly in the case where different speakers might use the same name or word to refer to different people) and other shared "discourse management" arrangements such as voice controlled e-mail, calendars, address books, and the like.

Text independence would also allow the speaker recognition function to be carried out in parallel with other functions in a manner transparent to a user and for a plurality of concurrent users at differing access levels without requiring interruption for new commands or identification of a user whenever a new user is encountered. Thus, access control or personalization can be carried out on a substantially continuous basis without any user detectable interference with other operations or system functionality even though some processing overhead would, of course, be necessary. Moreover, text independence of speaker identification supplies additional information which could be used to accommodate particular preferred utterances of each enrolled user and to improve resolution of ambiguity of command understanding as well as presenting the possibility of coherence checks to validate the recognition process and avoid compromise of the system through use of mechanical or electrical sound reproduction.

SUMMARY OF THE INVENTION

It is therefore an object of the present invention to provide a speaker recognition system which is text independent and transparent to any authorized user.

It is another object of the invention to provide a speaker recognition system which improves command understanding ambiguity resolution.

It is a further object of the invention to provide a speaker verification system which can accommodate a plurality of speakers concurrently and maintain access control for one or more users during use without interruption of such use.

It is a further object of the invention to provide an access authorization control system which can concurrently provide different levels of access authorization to each of a plurality of concurrent users.

It is a further object of the invention to provide a text independent system of speaker identification and verification which can be directly used in call center types of environments to simplify access to a customer file and in which the verification is used as a secondary system to accept the customer's commands or requests.

In order to accomplish these and other objects of the invention, a method and apparatus for text independent speaker recognition is provided comprising Arrangements for performing the steps of sampling overlapping frames of a speech signal, computing a feature vector for each said frame of the speech signal, comparing each feature vector with vector parameters and variances stored in a codebook corresponding to an enrolled speaker, accumulating the number of frames for which the corresponding feature vector corresponds to vector parameters and variances in a codebook, and identifying an enrolled speaker or detecting a new speaker in response to results of the accumulating step or the comparing step, respectively.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
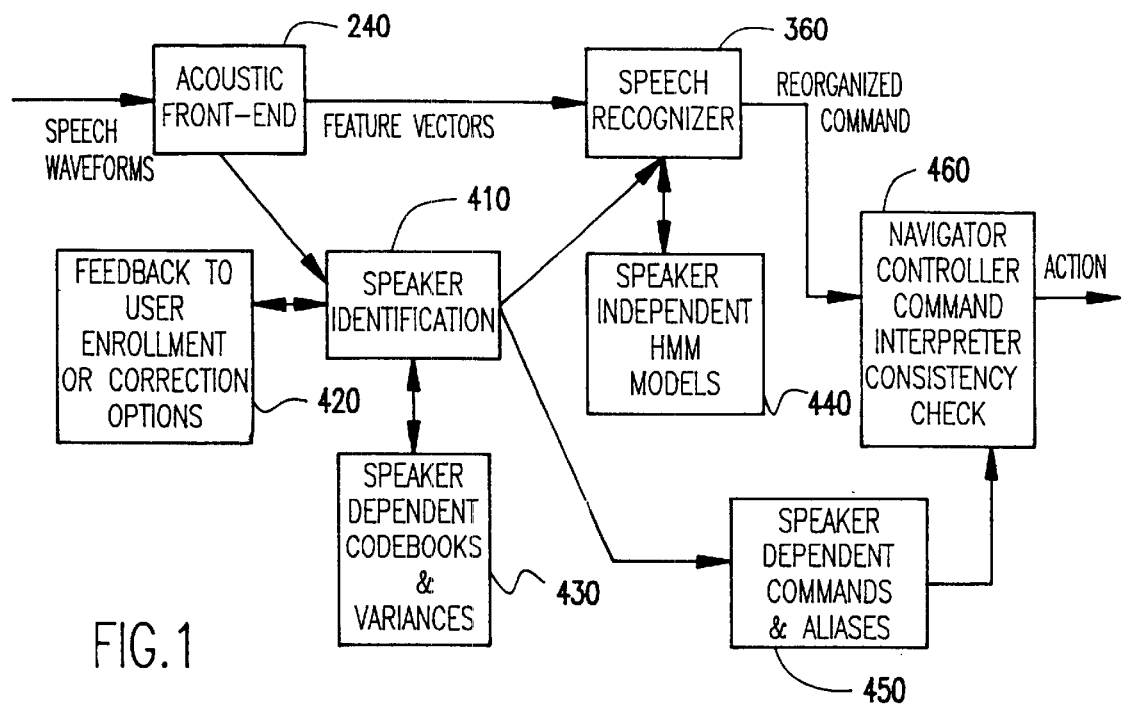
FIG. 1 is a flow chart or high-level block diagram of an embodiment of the invention providing command ambiguity resolution.

Referring now to the drawings, and more particularly to FIG. 1, there is shown a flow chart or high-level block diagram of a preferred form of the invention particularly adapted for ambiguity resolution. It should be understood that the present invention is usable with any speech recognition system and is not, in any way, limited to use with or dependent on any details or methodologies of any particular speech recognition arrangement with which the invention may be employed.

It should also be understood that the depiction of the invention in FIGS. 1–4 could be considered as being a high-level block diagram of apparatus for carrying out the invention as well as a flow chart. In this regard, it should be further understood that while the invention is preferably carried out utilizing a suitably programmed general purpose digital computer, the functional elements depicted in the drawings are exemplary of functional elements which would be established within the computer by such programming. The Figures thus also illustrate a suitable and preferred processor architecture for practicing the invention which may be achieved by programming of a general purpose processor.

Of course, a special purpose processor configured in the manner depicted in FIGS. 1–4 would be expected to achieve somewhat enhanced performance levels in comparison with a general purpose processor. Nevertheless, a general purpose processor is presently preferred in view of the flexibility which may be provided for inclusion of other processing as may be desired. FIG. 1 illustrates an embodiment of the invention in a preferred form for improving ambiguity resolution including acoustic front end 240 and speech recognizer 360. These elements are also present in the embodiments of the invention illustrated in FIGS. 2 and 3 as well as being characteristic elements of any classical speech recognition system. As alluded to above, the invention can be implemented with any speech recognition system which includes such elements and thus FIGS. 1–3 indicate how the invention may be adapted to a generalized speech recognition system such as the commercially available large vocabulary IBM Voice Type Dictation 3.0 system.

The text independent speaker recognition system in accordance with the invention preferably utilizes feature vectors similar to those available from acoustic front end 240 as described above. Physiologically related MEL cepstra, delta and delta-delta feature vectors are preferred for efficiency and effectiveness of speaker identification or verification although other known feature vectors could be used. In any case, the development of such feature vectors from an input signal is purely a function of the speech recognizer and need not be separately provided for speaker recognition in accordance with the present invention and it is convenient and preferred to utilize feature vectors which are available although feature vectors out may also be separately derived in the practice of the present invention.

A minimum of information specific to the voice of an enrolled speaker is provided in codebooks 430 in the form of a set of about sixty-five clustered feature vectors and variances which are captured under control of the speaker recognition processor 410 as each new speaker is enrolled. As the speaker is recognized, feedback of the recognition information is given to the user through any convenient device such as a display, indicator, annunciator or printer, as indicated at 420. The user can correct the result of the speaker recognition by indicating that the recognition is incorrect or by indicating (e.g. by marking a menu) that he or she is a new user who requires enrollment in the event that the new user has been incorrectly recognized as a previously enrolled user. At the same time, the speaker can enroll specific commands, preferences and other speaker-specific information to be uniquely associated with the speaker. Such commands, preferences and information are referred to herein as aliases since they are specialized forms of commands (e.g. procedural short-cuts or macros specific to an individual user) available on the system or which the system can otherwise accommodate but are uniquely modified for use by the identified speaker in accordance with the speaker identified.

Typically about ten seconds of speech generally including a list of words containing a variety of speech formants are sufficient for capture of the feature vectors, variances and scores for a codebook and enrollment of a speaker. Since these feature vectors and variances are captured during enrollment which is specific to a single speaker, the codebooks corresponding to other enrolled speakers are not affected. It should be understood that these feature vectors, variances and scores are specific to individual enrolled speakers and, while derived from enrolling text, are independent of any feature vectors which might exist in the overall system which are associated with any particular command. Therefore, the speaker identification process in accordance with the present invention is completely independent of speech or command recognition. Once speaker identification has been independently achieved, however, commands or aliases associated with the identified speaker (e.g."my mother"—meaning the mother of the identified speaker) and stored in a database depository of such types of information can be made available to the command interpreter 460 to resolve ambiguities of command understanding. This command is preferably fed back to the speaker to allow for correction if improperly interpreted.

It should also be understood that at the level of the command interpreter 460, a check of speaker recognition process consistency can be done. Specifically, in the context of the interaction of the user, only certain answers or commands will be appropriate at any particular point in time. Thus by simply comparing answers or commands with a list of appropriate alternative answers or commands, the system can check that the commands are correctly formulated and/or pertinent or that answers associated to the commands are coherent in order to verify that the identified user is, indeed, interacting with the system rather than merely producing random speech utterances, as might be done with a recorder.

When an enrolled speaker uses the system, the acoustic features of any utterance are computed and simultaneously provided to the speaker identification system 410 of the present invention and the speech recognizer 360. When a command is not ambiguous, it is not necessary to use the speaker identity information in interpreting or understanding the command. After receiving the command, the speaker is identified and, if a corresponding alias has been enrolled by the recognized speaker, the corresponding special vocabulary and aliased instructions of the speech recognizer 360 are selected.

The speaker identification phase is implemented with a vector quantizer decoder of speaker identification element 410. On a frame-by-frame basis, the vector quantizer decoder 410 identifies the closest codebook or ranks the closest codebooks by comparison of the vector computed from the frame with the codebooks, variances and scores 430. Each feature vector is scored against feature vectors forming the codebooks based on the vector parameters and variances in the codebooks and the scores are accumulated for each codebook. The specific scoring technique is not critical to the practice of the invention but should be based on the distance of each dimension of each feature vector from a corresponding dimension of each vector in each codebook. A histogram is thus developed which counts or accumulates how many frames have selected each codebook; the codebook most often selected identifying the potential speaker. By the same token the average distance of the vector parameters from the closest codebook allows detection (e.g. based on an empirically or adaptively derived threshold) of new speakers and, if desired, the user may be prompted with an enrollment menu and a further codebook developed.

The system described above can be implemented in different ways as long as the speaker recognition and speech recognition functions are combined as described. It is also possible to simulate the text independent speaker recognition system described above with a text dependent system such as template matching in which each instruction enrolled by the user can be used to identify the user in order to avoid interruption of use and to provide essentially continuous speaker identification. However, such an implementation carries the additional burden of enrollment and subsequent storage of all commands to be used by a particular enrolled speaker.

It should be appreciated that ambiguity resolution and accommodation of enrolled aliases is completely transparent to the user both during enrollment and in use. That is, the speaker may be enrolled anonymously and need not provide any identification information in order to use the system. Also, if a user presents significant changes in voice quality with, say, stress, fatigue or the like, multiple codebooks can be enrolled for a single user. The system thus provides additional flexibility and improves the user-friendly impression of services provided. Thus, this embodiment of the invention provides an adaptive capability for ambiguity resolution by recognition of any user. The complete text independence of this embodiment of the invention can be similarly appreciated from the fact that the actual identity of the user need not be known to the system for a codebook and/or speaker dependent vocabulary to exist and be available for ambiguity resolution.

However, in such a case, no security function is provided. Nevertheless, speaker verification can be provided through the detection of new users and new enrollments suitably restricted, if desired. Aliases and personal commands and information are already restricted to the speaker which enrolled them.

Enrolling data may also be used to adapt the speech recognizer 360 to particular users by adaptive modification or training of speaker independent templates or statistical models such as Hidden Markov Models (HMM) 440 corresponding to the vocabulary of the speech recognizer. Additionally, unrecognized utterances can be defined by the user during enrollment or later enrollment correction by prompting the user to spell the word whenever speech recognition is unsuccessful. The new word can then be added to the vocabulary of the speech recognizer together with its most plausible baseform (lexeme) determined from the data decoded by the speech recognizer combined with text-to-pronunciation rules and preferably implemented in a decision tree.

Optionally, since an increase of recognizable vocabulary can theoretically increase response time of the system, new words may be associated with particular speakers and only called, together with the remainder of the system vocabulary, in response to speaker recognition in accordance with the invention. This capability of the invention also allows a particular speaker to enroll any desired utterance and define correspondence with other recognizable words to customize the system response.

Thus, if the speech recognizer 360 cannot reliably recognize a word as spoken by a particular speaker even though it may be in the system vocabulary, a speaker-dependent vocabulary of, for example, commands may be readily developed and stored along with aliases at memory 450. Thus, even where different speakers may use the same word to call different commands such an ambiguity may be readily resolved as well as resolving ambiguity between different recognizable commands when spoken by different individuals.

Besides aliases, vocabulary and commands, files can also be associated with an enrolled speaker in the same manner.

In a call center environment, the user utterances can be separated from the questions of the Integrated Voice Response (IVR) or the operator in a text independent fashion and the file retrieved based on text independent speaker identification. Again, text independence allows this process to be done in a completely unobtrusive and transparent manner without burden to the user or delay of system response.

Figure 2:
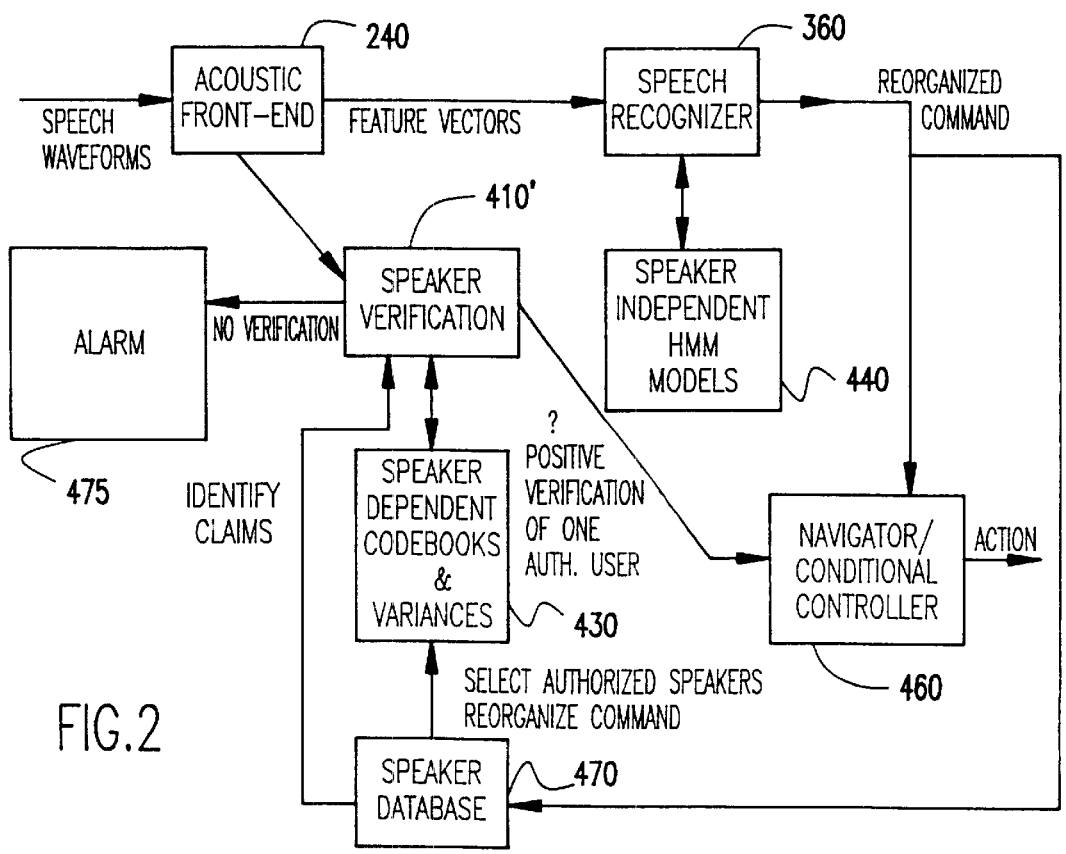
FIG. 2 is a flow chart or high-level block diagram of an embodiment of the invention providing speaker verification for continuous access control.

Referring now to FIG. 2, a variation of the invention providing access control by text independent speaker recognition will be discussed. Elements which are common to the embodiment of FIG. 1 are referred to by the same reference numerals used therein. Feedback to the user for enrollment is not shown in FIG. 2 since enrollment of speakers is assumed to be complete for purposes of this discussion. However, the function of the speaker verification element 410' is precisely the same as 410 described above but enrollment or overwriting of speakers and formation or modification of corresponding codebooks would be performed under control of a system administrator or in response to a secure code (e.g., password or PIN number), key switch or the like. Also the verification phase involves consistency checks as disclosed in concurrently filed U.S. patent application Ser. No. 08/787,029 assigned to the assignee of the present invention and fully incorporated by reference herein). An alternative approach can be followed whereby, starting from an existing database of enrolled speakers, the codebook are clustered with a bottom-up algorithms as disclosed in concurrently filed U.S. patent application Ser. No. 08/787,039 assigned to the assignee of the present invention and fully incorporated by reference herein). According to that invention, the speaker to be verified falls under a class of speaker. The other speakers constitute what we call the cohort of the speaker. Now speaker identification as described for FIG. 1 is performed over the set of the speaker and its cohort. If the speaker to be verified is consistently identified, the verification is positive.

As described above, quantized feature vectors are computed by the acoustic front-end 240 and provided simultaneously to the speech recognition system 360 and speaker verification element 410'. Speech recognition is carried out simultaneously with speaker identification in the same manner discussed above. While the speech recognition is dependent on enrolled commands, the speaker recognition function remains text independent at least within the gamut of those commands which can also be supplemented with enrolled aliases and the like as discussed above. That is, the commands themselves are sufficient for speaker recognition and speaker recognition is thus entirely transparent to the user during system use while allowing continual authorization checks of each concurrent user at each use/command.

In the case of file access over, for example, a distributed network, the user's computer or terminal is assumed to have a multi-media platform. In the ideal case, a voice activated navigator or other form of conditional controller 460 is used. Whenever a user (claiming to be a particular user) tries to access a file protected by some permission, the user's voice is verified by using the recognized command to access a speaker database 470 which contains a list of speakers for whom the command or access permission is enrolled. The list of authorized speakers is then provided to the speaker recognition element 410 for comparison with the speaker actually recognized, if any. This allows access authorization and speaker verification without the use of cumbersome passwords or any other procedure which disrupts authorized use of the system.

The result of speaker verification 410 is provided to navigator/conditional controller 460 which provides a comparison (essentially an AND function prior to issuing the command recognized by the speech recognizer 360, provided thereto. Thus, when using a navigator, no prompt is required for access since the commands can be directly verified and identified with authorized users. The text independence of the speaker recognition allows use of all information involved in the request (e.g. command and filename). In conventional systems, the filename could never be used in text dependent or text prompted speaker verification since it would be impossible to enroll all filenames which may be called and which may not exist at the time of enrollment.

When a navigator is not available or used, other network security systems are often used (such as a so-called Andrew File System (AFS)). In such a system, network distributed information is made available only if the user has the necessary permission (which means that he has been verified) and is holding a token authenticating this verification. Whenever this token is lost or outdated, a new verification is required and is obtained by use of a password. In the system of the present invention, each such verification can be accomplished by text independent speaker recognition rather than a password and the token can be renewed at each command or file access or, somewhat less rigorously, speaker recognition can be systematically used to reduce the interval between token renewal without increasing the burden on the user or interference with use of the system. In either case, these effects of the invention can clearly be extended to shared databases or network applications in which only some pre-enrolled users have access to some functionalities, as will be discussed in greater detail below. Eventually, this method can be used to authenticate the origin of voiced commands which are transmitted to remote systems. Every time that a remote system receives an order from its operator, it would verify that the command was, indeed, generated by the authorized operator.

As another potential use of the system in accordance with the invention, customer verification can be provided in call centers. After customer identification using the customer name or even speaker identification among a limited set of customers and during order taking by interaction of an operator or an IVR for automatic entry, the customer identity is verified. In the event of rejection, the order or requests are flagged as suspect and can be separately verified or otherwise handled, for example, by asking questions of the customer or later calling of the customer.

While restriction of commands and file access permissions to particular enrolled speakers can be accomplished in a manner described above in regard to FIG. 2, FIG. 3 illustrates an alternative, conceptually distinct, approach to correlation of authorizations with commands. It should be noted that in FIG. 3, there are no user identification claims but, conversely, a pool of users who may have simultaneous access to the voice control system. In contrast with the embodiment of FIG. 2, whenever a command is issued, the system identifies the user to ascertain that the speaker/user is authorized to issue that command. The provision of the recognized command to the speaker database 470 and its provision of information to the speaker verification system 410' and the speaker dependent codebooks 430 are omitted. In this case, the speaker identification, if any, is directly provided to the conditional controller 460' which stores authorized commands for each enrolled user, preferably in the form of a look-up table (LUT) accessible by speaker identification information. If a speaker is identified and a corresponding list of authorized commands can be provided, the recognized command may be simply compared against the list before the command is issued.

Thus, for example, response of voice controlled functions of an automobile could be restricted to a driver based on only a single command utterance which allows the driver (or authorized command issuer if a person other than the driver could issue a less critical command) to be identified among other vehicle occupants. In this way, a restricted command would not be executed if issued by occupants of the vehicle other than the driver. Similarly application of the system to so-called intelligent houses or rooms can limit responses to enrolled occupants. Text independence prevents the need for periodic interruptions of use of the system or prompts to users.

It should also be recognized that this embodiment of the invention is applicable to both open and closed speaker sets and, in the former, all the adaptive speaker recognition effects described above in regard to the embodiment of FIGS. 1 and 2 are available. It should be recalled that no security function was provided in the embodiment of FIG. 1 but that adaptive techniques were used for ambiguity resolution in speech recognition. In the embodiment of FIG. 2, applicability to open speaker sets may be accommodated since security is provided by entries in the speaker database 470 which contains enrolled authorized commands for enrolled users and a speaker may be enrolled and recognized without authorized commands being provided.

Figure 3:
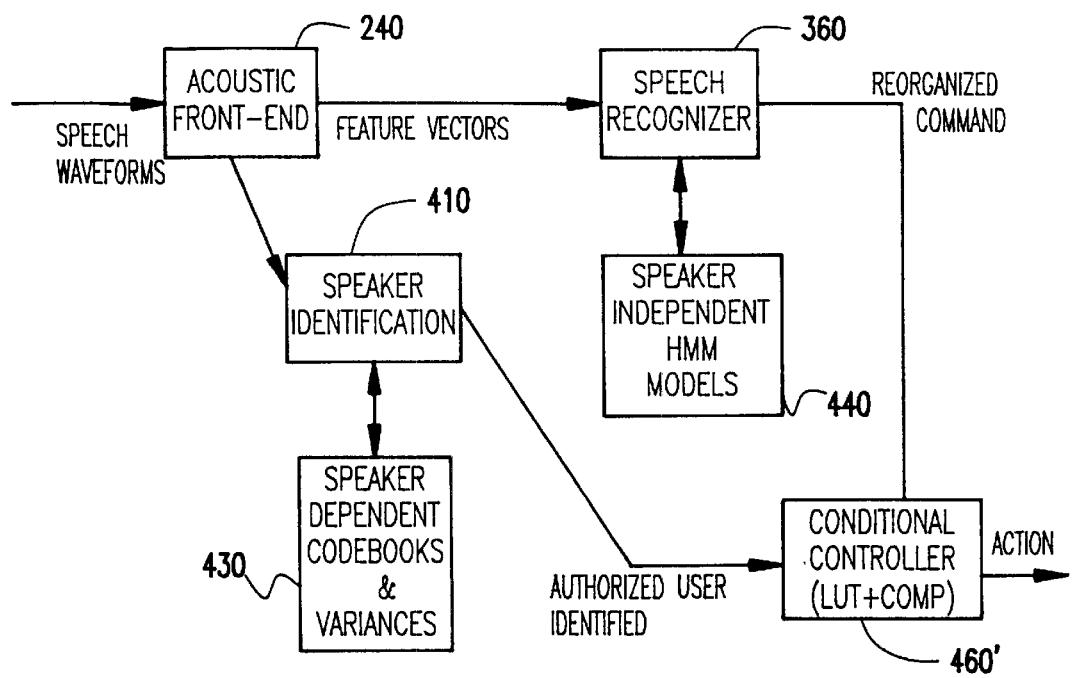
FIG. 3 is a flow chart or high-level block diagram to restrict access authorization levels in accordance with speaker identification.

The embodiment of FIG. 3, which includes a look-up table in the conditional controller 460', provides a comparable level of security (reduced only by the high level of confidence in a positive identification by codebook access control) with a comparable response time to the embodiment of FIG. 2 if the user list is small. If security is unimportant or of low importance, the look-up table can be omitted and speaker identification element 410 need only provide an indication of whether or not the command was spoken by the current authorized user (e.g. the driver in an application to an automobile) or any of a plurality of authorized users in a closed or open set. Thus, the embodiment of FIG. 3, whether or not a look-up table of commands is provided, can be considered as a hybrid of the embodiments of FIGS. 1 and 2 and represents an embodiment in a continuum of adaptations for particular applications which could be made in accordance with the principles of the invention.

In the interest of completeness, therefore, control of ignition of an automobile will be discussed in connection with FIG. 4. Specifically, as in ordinary operation of the automobile, the process in accordance with this application of the principles of the invention is preferably initiated by some action which normally would take place during operation of the automobile absent inclusion of the invention, such as the driver turning on the ignition 510 or occupying the driver's seat. When such an event occurs, the driver is prompted for an utterance, preferably by voice synthesis or a "canned" audible message to which the driver would naturally respond verbally, as indicated at 520. Operation of the invention as described above then is performed to verify the speaker as an enrolled user. If the verification is successful ignition is allowed (531) if not, ignition is blocked but, preferably, blocking of the ignition can be overridden by a key code to allow operation of the vehicle.

In accordance with principles of the invention as discussed above, the driver may be effectively made a closed set of one authorized user for all available voice actuated functions. However, such a function is not incompatible with other voices being handled as an open set of users for a subset of vehicle functions. Further, channel identification based techniques for acoustic front-end processing and decoding can be used to avoid control occurring due to other sounds, including the driver's recorded voice.

Figure 4:
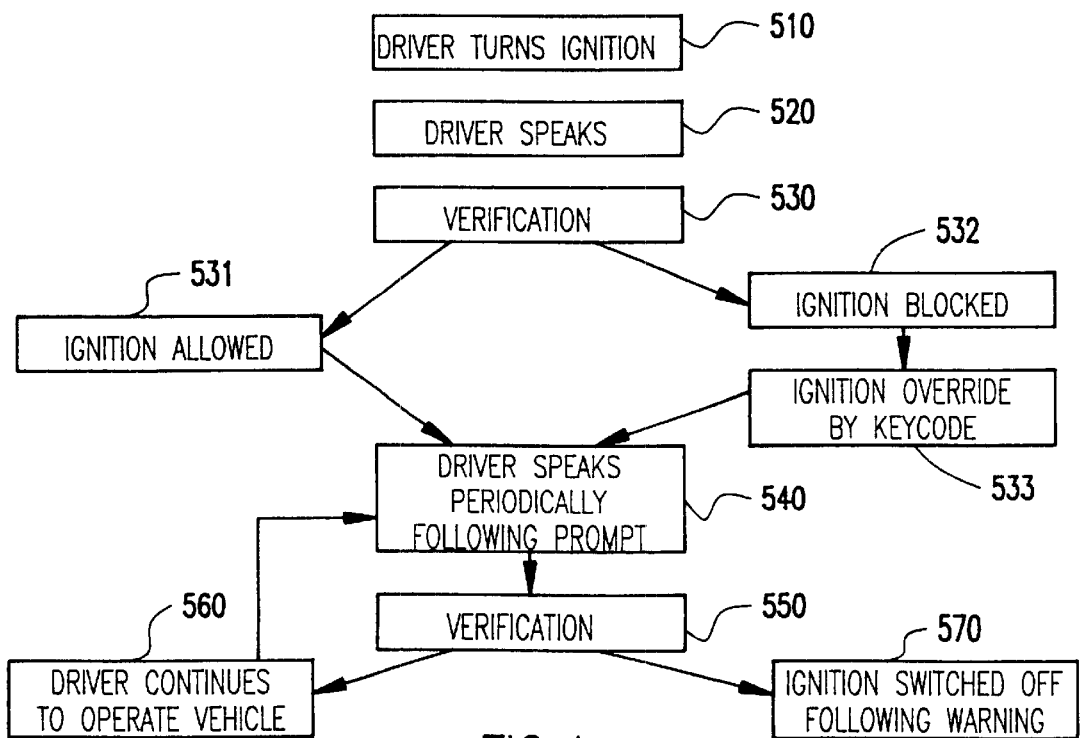
FIG. 4 is a flow chart or high-level block diagram illustrating application of the invention to control the usage of an automobile.

The remainder of the process illustrated in FIG. 4 is optional or can be employed with many variations. For example, if only the driver is present in the vehicle and positively identified as an authorized user, there is little need for further security until a door or window is opened. Alternatively, periodic audible prompts for verbal response may be desirable since they would have little, if any, effect of the driver's ability to continuously operate the vehicle in a desired manner and may provide some attention enhancing or fatigue reduction function (such as providing a prompt when speed varies significantly from an average over a relatively short period of time or numerous sharp corrections of steering occur periodically). Alternatively, the system in accordance with the invention could respond to any spontaneous utterance of the driver or normal conversation in which the driver may take part. In any case, when an utterance occurs, verification can be accomplished in a text independent manner as described above and depicted at 550. If successful the driver can continue to operate the vehicle (560) until the next utterance occurs or is prompted. If unsuccessful, a warning is issued and ignition may be terminated after a lapse of time with no successful verification.

As a simple extension of the invention, the text independent system of FIG. 3 can be easily adapted to provide tagging of a participant to a teleconference or other meeting. Each utterance is interpreted as a command for such a tagging operation and the system provides the speaker identity which can be used as or to select a speaker tag. All anticipated participant speakers would be pre-enrolled and new participants would be tagged as unknown speakers. The unknown speakers can be further separated into unknown speaker 1, unknown speaker 2, etc. using a speaker classification technique described in U.S. patent application Ser. No. 08/595,722 filed Feb. 2, 1996, and entitled Transcription of Speech Data with Segments from Acoustically Dissimilar Environments, which is hereby fully incorporated by reference.

In view of the foregoing, it is seen that the invention provides a text independent technique for speaker identification which may be advantageously used, with or without additional coherence checks, to limit access to or control any of a large variety of applications or provide enhanced functionality by personalization of response through acceptance of aliases and adaptive response as well as use of speaker dependent information for ambiguity resolution in recognition of speech, in any combination and with substantially complete transparency during enrollment and use. The completely transparent and text independent speaker recognition coupled with flexibility of adaptation and customization is particularly applicable to call center types of environments and control applications.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of performing speaker recognition in connection with access control, comprising:
   performing text-independent speaker recognition on a speech signal to identify a speaker;
   recognizing a spoken utterance from said speech signal, said spoken utterance being uttered in connection with an access request;
   determining if said identified speaker is authorized to obtain access;
   granting said access if said identified speaker is indeed authorized; and
   continuously verifying the recognition of said speaker in said speaker recognition step as said speaker inputs additional speech signals.

2. A method of performing speaker recognition, comprising:
   simultaneously performing text-independent speaker recognition on a speech signal to simultaneously is identify a speaker;
   recognizing a command from said speech signal;
   interpreting said command based on said speaker identified in said text-independent speaker recognition step;
   retrieving enrolled information from a database corresponding to interpretation of said command in said interpreting step; and
   performing said command based on said enrolled information.

3. The method of claim 2, wherein said enrolled information includes at least one of information corresponding to a preference of said speaker, a word corresponding to a macro of said speaker, a procedural short-cut, and a speaker-specific vocabulary word.

4. A method of performing speaker recognition, comprising:
   performing text-independent speaker recognition on a speech signal to identify a speaker;
   recognizing a command from said speech signal;
   simultaneously interpreting said command based on said speaker identified in said text-independent speaker recognition step;
   performing coherence checking for said command;
   retrieving enrolled information corresponding to said speaker identified in said text-independent speaker recognition step; and
   interpreting said command in accordance with said enrolled information retrieved corresponding to said speaker identified in said text-independent speaker recognition step.

5. A method of performing speaker recognition, comprising:
   performing text-independent speaker recognition on a speech signal to identify a speaker;
   simultaneously recognizing a command from said speech signal;
   interpreting said command based on said speaker identified in said text-independent speaker recognition step, said interpreting of said command being based on alias information corresponding to said speaker identified in said text-independent speaker recognition step, said alias information including at least one of information corresponding to a preference of the speaker, a word corresponding to a macro of the speaker, a procedural short-cut, and a speaker-specific vocabulary word.

6. A method of performing speaker recognition, comprising:
   performing text-independent speaker recognition on a speech signal to identify a speaker;
   simultaneously recognizing a command from said speech signal;
   interpreting said command based on said speaker identified in said text-independent speaker recognition step, said interpreting step in turn comprising the sub-steps of:
      determining if said recognized speaker is authorized to issue said command; and
      performing said command if said identified speaker is indeed authorized.

7. The method of claim 6, wherein:
   said determining sub-step comprises comparing said identified speaker with a list of speakers who are authorized to perform said command; and
   said performing sub-step comprises performing said command if a match exists between said identified speaker and said list.

8. The method of claim 6, wherein:
   said determining sub-step comprises comparing said command with a list of commands which are authorized to be performed by said identified speaker; and
   said performing sub-step comprises performing said command if a match exists between said command and said list.

9. A method of performing speaker recognition in connection with access control, comprising:
   performing text-independent speaker recognition on a speech signal to identify a speaker;

simultaneously recognizing a spoken utterance from said speech signal, said spoken utterance being uttered in connection with an access request;

determining if said identified speaker is authorized to obtain access; and granting said access if said identified speaker is indeed authorized.

10. The method of claim 9, wherein:

said determining step comprises comparing said identified speaker with a list of speakers who are authorized to obtain access; and said granting step comprises granting said access if a match exists between said identified speaker and said list.

11. The method of claim 10, wherein:

said access request is directed to a call center;

said determining step comprises verifying said identified speaker as a customer having a verified customer identity; and said granting step comprises granting said access if said identified speaker is indeed a customer having a verified customer identity.

12. The method of claim 9, wherein said step of performing text-independent speaker recognition includes:

(a) sampling overlapping frames of said speech signal;
(b) computing a feature vector for each said frame of said speech signal;
(c) comparing each said feature with vector parameters and variances stored in a plurality of codebooks corresponding to enrolled speakers;
(d) accumulating a number of frames for which the corresponding feature vector corresponds to vector parameters and variances in said codebooks; and
(e) identifying said speaker in response to results of at least one of said accumulating step and said comparing step.

13. The method of claim 12, wherein said spoken utterance is a command, and wherein said recognizing step includes:

recognizing said command using a speech processing model formed from information independent from information used to form said codebooks.

14. A method of performing speaker recognition, comprising:

performing text-independent speaker recognition on a speech signal to identify a speaker;

simultaneously recognizing a command from said speech signal;

interpreting said command based on said speaker identified in said text-independent speaker recognition step, said interpreting step in turn comprising the sub-steps of:

comparing said command with a list of authorized commands; and performing said command based on results obtained from said comparing step.

15. A method of performing speaker recognition, comprising:

performing text-independent speaker recognition on a speech signal to identify a speaker;

simultaneously recognizing a spoken utterance from said speech signal to obtain a recognized spoken utterance; and resolving ambiguity in said recognized spoken utterance based on said identity of said speaker identified in said text-independent speaker recognition step.

16. The method of claim 15, wherein said spoken utterance is a command which has a meaning that varies depending on who utters said utterance.

17. A method of performing speaker recognition, comprising:

performing text-independent speaker recognition on a speech signal to identify a speaker, said performing in turn comprising identification of said speaker as a new user;

recognizing a spoken utterance from said speech signal; and enrolling said new user in real time in response to said identification of said speaker as said new user.

18. A method of performing speaker recognition in connection with access control, comprising:

performing text-independent speaker recognition on a speech signal to identify a speaker, said performing in turn comprising the sub-steps of:

(a) sampling overlapping frames of said speech signal;
(b) computing a feature vector for each said frame of said speech signal
(c) comparing each said feature vector with vector parameters and variances stored in a plurality of codebooks corresponding to enrolled speakers;
(d) accumulating a number of frames for which the corresponding feature vector corresponds to vector parameters and variances in said codebooks; and
(e) identifying said speaker in response to results of at least one of said accumulating step and said comparing step;

recognizing a spoken utterance from said speech signal, said spoken utterance being uttered in connection with an access request;

determining if said identified speaker is authorized to obtain access;

granting said access if said identified speaker is indeed authorized; and continuously verifying the recognition of said speaker in said identifying step as said speaker inputs additional speech signals.

19. An apparatus for speaker recognition, comprising:

a speaker recognition processor which performs text-independent speaker recognition on a speech signal to identify a speaker;

a speech recognizer which simultaneously recognizes a command from said speech signal;

a controller-interpreter which interprets said command based on said speaker identified by said speaker recognition processor, said controller-interpreter being configured to determine if said identified speaker is authorized to issue said command, and to authorize performance of said command if said identified speaker is indeed authorized.

20. The apparatus of claim 19, further comprising a speaker database containing a list of speakers who are authorized to perform said command, wherein said controller-interpreter and said speaker recognition processor are configured to compare said identified speaker with said list of speakers and to authorize performance of said command if a match exists between said identified speaker and said list.

21. The apparatus of claim 19, wherein said controller-interpreter stores a list of commands which are authorized to be performed by said identified speaker, and is configured to compare said command with said list of commands and to authorize performance of said command if a match exists between said command and said list.

22. An apparatus for speaker recognition in connection with access control, comprising:
   a speaker recognition processor which performs text-independent speaker recognition on a speech signal to identify a speaker, said speaker recognition processor being configured to determine if said identified speaker is authorized to obtain access;
   a speech recognizer which simultaneously recognizes a spoken utterance from said speech signal, said spoken utterance being uttered in connection with an access request; and
   a controller-interpreter which is configured to authorize granting of said access if said identified speaker is indeed authorized.

23. The apparatus of claim 22, further comprising a speaker database containing a list of speakers who are authorized to obtain access, wherein:
   said speaker recognition processor is configured to compare said identified speaker with said list of authorized speakers; and
   said controller-interpreter is configured to authorize granting of said access if a match exists between said identified speaker and said list.

24. The apparatus of claim 23, wherein said access request is directed to a call center and said speaker database includes customer identity information.

25. The apparatus of claim 22, further comprising:
   an acoustic front end which is configured to sample overlapping frames of said speech signal and to compute a feature vector for each of said frames of said speech signal; and
   a speaker database which stores vector parameters and variances in a plurality of codebooks corresponding to enrolled speakers; wherein said speaker recognition processor is configured to:
      compare each said feature vector with said vector parameters and variances to obtain a comparison;
      accumulate a number of frames for which the corresponding feature vector corresponds to said vector parameters and said variances in said codebooks to obtain an accumulation; and
      identify said speaker in response to at least one of said accumulation and said comparison.

26. An apparatus for speaker recognition, comprising:
   a speaker recognition processor which performs text-independent speaker recognition on a speech signal to identify a speaker;
   a speech recognizer which simultaneously recognizes a spoken utterance from said speech signal to obtain a recognized spoken utterance; and
   a controller-interpreter which is configured to resolve ambiguity in said recognized spoken utterance based on said identity of said speaker identified by said speaker recognition processor.

27. The apparatus of claim 26, wherein said spoken utterance is a command which has a meaning that varies depending on who utters said utterance.

28. An apparatus for speaker recognition, comprising:
   a speaker recognition processor which performs text-independent speaker recognition on a speech signal to identify a speaker, said speaker recognition processor being configured to identify said speaker as a new user;
   a speech recognizer which simultaneously recognizes a spoken utterance from said speech signal; and
   a controller-interpreter, which, together with said speaker recognition processor, is configured to enroll said new user in real time in response to said identification of said speaker as said new user.

29. A program storage device readable by machine, tangibly embodying a program of instructions executable by the machine to perform method steps for performing speaker recognition in connection with access control, said method steps comprising:
   performing text-independent speaker recognition on a speech signal to identify a speaker;
   recognizing a spoken utterance from said speech signal, said spoken utterance being uttered in connection with an access request;
   determining if said identified speaker is authorized to obtain access;
   granting said access if said identified speaker is indeed authorized; and
   continuously verifying the recognition of said speaker in said speaker recognition step as said speaker inputs additional speech signals.

30. A program storage device readable by machine, tangibly embodying a program of instructions executable by the machine to perform method steps for performing speaker recognition, said method steps comprising:
   performing text-independent speaker recognition on a speech signal to identify a speaker, said performing in turn comprising identification of said speaker as a new user;
   simultaneously recognizing a spoken utterance from said speech signal; and
   enrolling said new user in real time in response to said identification of said speaker as said new user.

31. A program storage device readable by machine, tangibly embodying a program of instructions executable by the machine to perform method steps for performing speaker recognition, said method steps comprising:
   performing text-independent speaker recognition on a speech signal to identify a speaker;
   simultaneously recognizing a command from said speech signal; and
   interpreting said command based on said speaker identified in said textindependent speaker recognition step, said interpreting method step in turn comprising the sub-steps of:
      determining if said identified speaker is authorized to issue said command; and
      performing said command if said identified speaker is indeed authorized.

32. A program storage device readable by machine, tangibly embodying a program of instructions executable by the machine to perform method steps for performing speaker recognition in connection with access control, said method steps comprising:
   performing text-independent speaker recognition on a speech signal to identify a speaker;
   simultaneously recognizing a spoken utterance from said speech signal, said spoken utterance being uttered in connection with an access request;
   determining if said identified speaker is authorized to obtain access; and
   granting said access if said identified speaker is indeed authorized.

* * * * *